No. 829,334. PATENTED AUG. 21, 1906.
C. G. HARDIE.
ELECTRIC BRAKE.
APPLICATION FILED JAN. 27, 1905.

WITNESSES
M. Hamilton.
Harry Hebig

INVENTOR
Charles G. Hardie
BY James Hamilton
ATTORNEY

UNITED STATES PATENT OFFICE.

CHARLES G. HARDIE, OF BUFFALO, NEW YORK.

ELECTRIC BRAKE.

No. 829,334.  Specification of Letters Patent.  Patented Aug. 21, 1906.

Application filed January 27, 1905. Serial No. 242,889.

*To all whom it may concern:*

Be it known that I, CHARLES G. HARDIE, a citizen of the United States, residing at Buffalo, in the county of Erie and State of New York, have invented certain new and useful Improvements in Electric Brakes, of which the following is a specification, reference being had to the accompanying drawings.

My invention relates to improvements in brakes controlled by an electric current which normally flows through the coils of the brake and holds the brake part of the device in non-braking position. When the current is interrupted, the brake part of the device is by mechanical means thrown into braking position.

One object of my invention is to provide a brake of the class described which shall be an integral part of the motor the rotation of which it is designed to govern, thereby dispensing with an outside suspension or bracket.

Another object of my invention consists in the provision of a brake of the class described which will prove efficient in operation and capable of quick repair and which will insure an absolute release of friction when the motor is running.

A third object of my invention resides in the production of an electric brake in which there will be no wear except on the parts actively engaged in the braking operation.

A fourth object of my invention lies in the provision of a support for the brake which shall necessitate no bearing.

Figure 1:
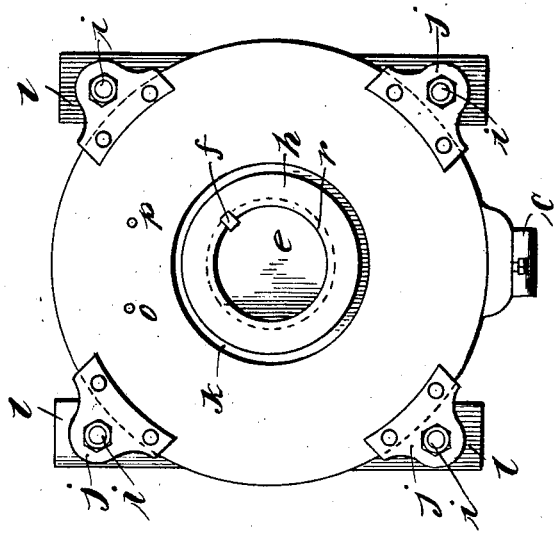
Figure 2:
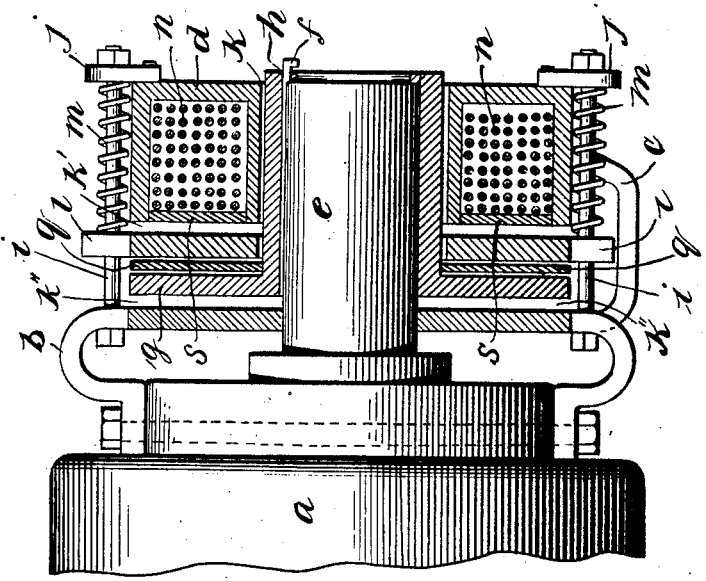

In the drawings illustrating the principle of my invention and the best mode now known to me of applying that principle, Figure 1 is an end elevation of my new brake, and Fig. 2 is a central longitudinal sectional view.

To the motor $a$ is bolted a support $b$, from which extends a bracket $c$, upon which rests the magnet-casing $d$. Upon the motor-shaft $e$ is secured by a key $f$ a friction-disk $g$, formed with a hub $h$, between which and the magnet-casing $d$, which forms a part of the magnetic circuit of the brake, there is an air-space $k$. Bolts $i$ extend from the support $b$ and carry at their outer ends lug-plates $j$, which are secured to the magnet-casing $d$. Slidably mounted on the bolts $i$ is an iron plate or armature $l$, which is connected with the springs $m$ and is drawn by magnetic attraction toward the coils $n$ when current flows through said coils, between which and the armature there is an air-space $k'$ when the current is interrupted. The current enters the coils at $o$ and leaves them at $p$. Attached to the disk $g$ is a disk $q$ of non-slippable or friction material, against which the armature $l$ is pressed by the springs $m$ when the current is interrupted and the magnetic circuit broken. The hub $h$ is formed with a flange $r$, which prevents the disk from being moved too far inwardly along the shaft $e$. Between the disk $g$ and the support $b$ there is an air-space $k''$. The coils $n$ are protected from injury by non-magnetic material $s$. Instead of the air-space $k$ a bushing may be interposed between the magnet-casing and the hub of the disk $g$. It is obviously immaterial whether the disk $q$ of non-slippable material be carried by the disk $g$ or by the armature $l$; nor need the disk $q$ have a flat rubbing-surface necessarily, as shown, for it may be made with a V-shaped rubbing-surface adapted to enter a V-shaped recess in the coöperating member.

From the above description it will be seen that in my new brake no bearing for the motor-shaft is needed in the brake suspension and that an air-space exists between the magnet-casing and the part rotating within it, whereby good ventilation is assured. At the same time no outside suspension is needed for my new brake, the structure being such as to form an integral part of the motor. Friction is produced on only one side of the disk, thereby insuring positive release from friction when the current flows. The wear of the parts is limited to the parts actually engaged in the braking operation.

What I claim is—

1. The combination with an electric motor provided with a shaft of a support secured to said motor, said support having a bracket projecting therefrom; a magnet the casing of which rests upon said bracket; bolts securing said casing to said support; an armature mounted upon said bolts; springs mounted on said bolts and controlling said armature; and a disk mounted upon the shaft of said motor, said armature being forced by said springs against said disk when the current ceases to flow in the coils of said magnet.

2. In combination with an electric motor comprising a motor-casing and a motor-shaft, a support secured to said casing; a magnet the casing of which is secured to said support by bolts; said bolts; a disk formed with a hub which is mounted upon said motor-shaft and projects through said magnet-casing free from contact therewith; an armature mounted on said bolts between said disk and said magnet; and springs mounted on said bolts and adapted to force said armature against said disk when the current through said magnet is interrupted; there being an air-space between said casing and the hub of said disk.

CHARLES G. HARDIE.

Witnesses:
C. C. ILSE,
E. C. COOPER.